Oct. 6, 1931.  M. J. PETERSEN  1,826,569
TRAP
Filed March 3, 1931
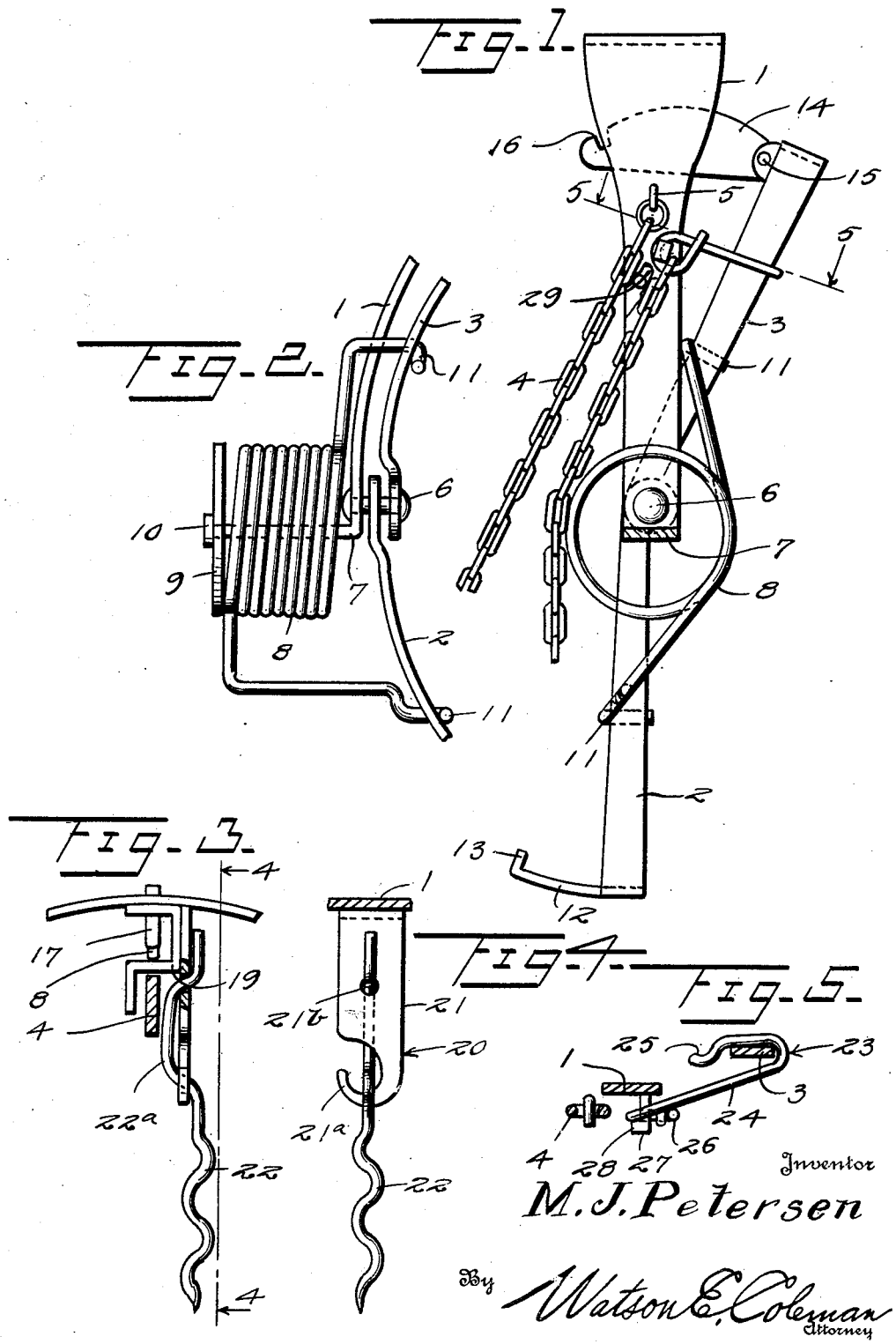

Patented Oct. 6, 1931

1,826,569

UNITED STATES PATENT OFFICE

MARTIN J. PETERSEN, OF CANYON, MINNESOTA

TRAP

Application filed March 3, 1931. Serial No. 519,828.

This invention relates to improvements in the trap which constitutes the subject-matter of my United States Patent Number 1,783,670, granted December 2, 1930, and which comprises an arcuate body adapted to be suspended from a tree or other support and provided with loops extending laterally outward from its ends, arcuate jaws provided at their ends with loops engaging said first loops to pivotally connect the jaws to the body, coil springs clipped to the outer sides of the ends of the body and having their ends engaged with the jaws to normally hold the jaws in closed relation, means carried by the jaws and adapted to releasably hold them in opened or set relation against the tension of the springs, a bait carrying element, and a trigger carrying said element and mounted on the body for movement when the bait is engaged to operate said means to effect the release of the jaws for movement into closed relation.

The present invention has for one of its objects to improve and simplify the means by which the jaws are connected to the body, and to attain this end comprehends providing the body with studs extending laterally inward from the ends thereof and providing the ends of the jaws with openings for the reception of the studs.

The present invention has for a further object to improve and simplify the means by which the springs are secured to the body, and to attain this end comprehends providing the body with arms extending laterally outward from the ends thereof and adapted to have the springs mounted and secured thereon.

The present invention has for a further object to improve the bait carrying element, and to attain this end comprehends providing an element of this character which shall embody a hook adapted to be secured to the trigger, and a spiral rod detachably engaged with the hook, the detachable engagement between the hook and spiral rod permitting the end to be used for the purpose of holding the bait.

The present invention has for a further object to provide means through the medium of which the trap may be set and baited at the trapper's home and carried and secured to its support without danger of the accidental release of the jaws from said position, and to attain this end comprehends the provision of a hook adapted to be releasably engaged with the body and one of the jaws when the latter are in set position.

The present invention is hereinafter more fully described and claimed, and illustrated in the accompanying drawings, wherein:—

Figure 1 is a view partly in side elevation and partly in vertical section of the trap embodying the improvements constituting the present invention.

Figure 2 is a view in side elevation of one side of the trap illustrating the new means for pivotally connecting the jaws to the body and the new means for supporting the springs from the body.

Figure 3 is a view partly in front elevation and partly in vertical section illustrating the new bait carrier.

Figure 4 is a sectional view taken on the plane indicated by the line 4—4 of Figure 3, and Figure 5 is a sectional view taken on the plane indicated by the line 5—5 of Figure 1.

Referring in detail to the drawings, 1 designates the body and 2 and 3 the jaws of the trap. The body 1 is of arcuate formation in elevation, and is adapted to be suspended from a tree or other support by means of a chain 4 which is secured to opposite sides of the body, as at 5. The body 1 is provided with headed studs 6 which extend laterally inward from the ends thereof, and it is provided with arms 7 which extend laterally outward from the ends thereof, and which are located slightly below the studs. The jaws 2 and 3 are of arcuate formation in elevation and have their ends pivotally engaged with the studs 6, the ends of the jaws being mounted on the pivot studs by the lower ends of the body 1 and the inner ends of the studs. Coil springs 8 are mounted on the arms 7 and are mounted thereon by the ends of the body 1 and disks 9 secured to the arms outwardly of the springs. The outer ends of the arms 7 are provided with heads 10 serving to hold the disks 9 in place. The springs 8 are provided with hooked terminals 11 which are engaged with the jaws 2 and 3 in such manner as to permit the springs to normally hold the jaws in closed relation and extend downwardly from the pivot studs 6.

When the jaws 2 and 3 are in opened or set relation, they extend in upwardly diverging relation from the pivot studs 6. A keeper 12 rigidly secured to the jaw 2 and provided with a lug 13, and a latch 14 pivotally secured at one end, as at 15, to the jaw 3 and provided at its other end with a notch 16 for the reception of the lug, provide means for releasably securing the jaws in opened or set relation.

When the jaws 2 and 3 are in this relation, the latch 14 extends through the upper side of the body 1, the notch 16 extends through the upper edge of the latch, and the lug 13 extends downwardly from the keeper 12 and engages in the notch. With the latch 14 and keeper 12 occupying these relative positions, it is only necessary to move the latch downwardly in order to effect the release of the jaws 2 and 3 for movement into closed relation by the springs 8. A pin 17 extends downwardly from the upper side of the body 1, and is provided at its lower end with a head 18. A trigger 19 which is mounted upon the pin 17 for vertical sliding movement thereon between the body 1 and the pin head 18, rests upon the latch 14, and is adapted to move downwardly to free the latch from engagement with the keeper 12 and thus effect the release of the jaws 2 and 3 for movement into closed relation.

A bait carrier 20 which is secured to and extends downwardly from the trigger 19, comprises a hook 21 secured directly to the trigger, and a spiral rod 22 detachably secured to the hook. The spiral rod 22 has a shank 22a which engages the bill 21a of the hook 21 and an opening 21b in the hook to detachably secure the rod to the hook. The spiral rod 22 is detachably secured to the hook 21 in order to permit one end to be used as a carrier for the bait.

The chain 4 is provided at its free end with a hook 23 which is adapted to be used for the purpose of holding the jaw 3 in opened position with respect to the jaw 2 while the trap is being set. The shank 24 of the hook 23 extends longitudinally beyond the bill 25 of the hook, and is provided at its free end with an eye 26 through the medium of which the hook is secured to the chain 4 and which is adapted to be engaged with a lug 27 extending laterally outward from one side of the body 1.

The eye 26 is located in a plane right angularly related to the plane in which the hook 23 is located, to the end that when it is engaged with the lug 27 the hook will occupy a position which will permit it to be readily engaged with the jaw 3 when the jaw is swung into opened position. The bill 25 of the hook 23 is offset in the direction of the shank 24 so as to prevent the jaw 3 from moving accidentally out of engagement with the hook. The lug 27 is formed integrally with the body 1, and is provided at its outer end with a shoulder 28 adapted to engage the eye 26 so as to hold the eye against accidental displacement from the lug.

In practice, the trapper may, before leaving his home, open and bait the trap, wrap the chain 4 around the opened jaws 2 and 3, and connect the hook 23 with the lug 27 and with the opened jaw 3, so that the trap may be carried, without danger of the jaws accidentally closing and injuring the trapper, to the tree or other support from which it is suspended by the chain. After the trap is suspended from the tree or other support, the latch 14 is engaged with the keeper 12, and thereafter the hook 23 is disengaged from the jaw 3 and lug 27. As the hook 23 holds the jaw 3 in opened position, this jaw cannot move accidentally into closed position while the latch 14 is being engaged with the keeper 12, and due thereto all danger of injury to the trapper when setting the trap is avoided. The body 1 is provided at that side thereof opposite the one carrying the lug 27 with an opening 29 for the reception of a nail or the like when it is desired to secure the trap to its support by a nail instead of by the chain 4.

The trap is secured to a support above the ground, and in view thereof the possibility of its being held against operation by snow or ice is reduced to the minimum and it cannot be sprung by mice or other small animals. The trap may be easily and quickly set, and its bait carrier 20 is so arranged that access thereto can only be had when the animal occupies a position which will cause the jaws 2 and 3 to engage it when it springs the trap.

While I have shown in the drawings the bait carrying member 22 mounted on the hook 20 for supporting the bait within the trap, I do not wish to be limited to this construction. If desired, the rod 22 may be removed from the hook 21 and the bait mounted on the hook portion 21a of the bait hook 21. This may be desirable when the bait is frozen and can be readily attached or secured to the hook 21a. The spiral rod 22 may be readily removed from the hook 21 by moving the same laterally in the direction toward the open end of the hook 21.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A trap comprising an arcuate body, studs extending laterally inward from the ends of the body, arcuate jaws having their ends pivotally engaged with the studs, arms extending laterally outward from the ends of the body, coil springs mounted upon the arms and having their terminals engaged with the jaws to normally hold the jaws in closed relation, means for latching the jaws in opened relation, a trigger for operating said latching means to effect the release of the jaws, and a bait carrier secured to the trigger.

2. A trap comprising an arcuate body, studs extending laterally inward from the ends of the body, arcuate jaws having their ends pivotally engaged with the studs, arms extending laterally outward from the ends of the body, coil springs mounted upon the arms and having their terminals engaged with the jaws to normally hold the jaws in closed relation, means for latching the jaws in opened relation, a trigger for operating said latching means to effect the release of the jaws, a bait carrying hook secured to the trigger, and a bait carrying rod detachably engaged with the hook.

3. A trap comprising an arcuate body, arcuate jaws pivoted at their ends to the ends of the body, arms extending laterally outward from the ends of the body, coil springs mounted upon the arms and having their terminals engaged with the jaws to normally hold the jaws in closed relation, means for releasably securing the jaws in opened relation, a trigger for operating said latching means to effect the release of the jaws, and a bait carrier secured to the trigger.

4. A trap comprising a body, jaws pivoted to the body for movement from a closed to an opened position, means releasably securing the jaws in opened position, a trigger movable to operate said means to effect the release of the jaws, means to close the jaws when released, a lug carried by the body, a flexible member secured to the body and providing means by which the trap may be suspended from a support, and a hook to be engaged with one of the jaws and having an eye connected to the flexible member and to be engaged with the lug when said jaw is in opened position.

5. A trap comprising a body, jaws pivoted to the body for movement from a closed to an opened position, means releasably securing the jaws in opened position, a trigger movable to operate said means to effect the release of the jaws, means to close the jaws when released, a lug extending outwardly from the body and provided at its outer end with a shoulder, a flexible member secured to the body and providing means by which the trap may be suspended from a support, a hook to be engaged with one of the jaws and provided with an eye secured to the flexible member and to be engaged with the lug inwardly of the shoulder when said jaw is in opened position.

6. A trap comprising a body, jaws pivoted to the body for movement from a closed to an opened position, means releasably securing the jaws in opened position, a trigger movable to operate said means to effect the release of the jaws, means to close the jaws when released, a lug carried by the body, and a hook to be engaged with one of the jaws and provided with an eye to be engaged with the lug when said jaw is in opened position.

In testimony whereof I hereunto affix my signature.

MARTIN J. PETERSEN.